United States Patent
Zhu et al.

(10) Patent No.: US 11,843,494 B2
(45) Date of Patent: Dec. 12, 2023

(54) ORTHOGONAL FREQUENCY-DIVISION MULTIPLE ACCESS-BASED BACKSCATTER SYSTEM

(71) Applicant: SHANGHAI JIAO TONG UNIVERSITY, Shanghai (CN)

(72) Inventors: Fengyuan Zhu, Shanghai (CN); Yuda Feng, Shanghai (CN); Qianru Li, Shanghai (CN); Xiaohua Tian, Shanghai (CN); Xinbing Wang, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 17/796,639

(22) PCT Filed: Jun. 23, 2021

(86) PCT No.: PCT/CN2021/101725
§ 371 (c)(1),
(2) Date: Jul. 29, 2022

(87) PCT Pub. No.: WO2021/223777
PCT Pub. Date: Nov. 11, 2021

(65) Prior Publication Data
US 2023/0103804 A1 Apr. 6, 2023

(30) Foreign Application Priority Data

May 8, 2020 (CN) .......................... 202010383618.6

(51) Int. Cl.
*H04L 27/26* (2006.01)
(52) U.S. Cl.
CPC .............................. *H04L 27/2626* (2013.01)

(58) Field of Classification Search
CPC .................................................. H04L 27/2626
See application file for complete search history.

(56) References Cited

U.S. PATENT DOCUMENTS

2018/0375703 A1* 12/2018 Kellogg .................. H04L 27/26

FOREIGN PATENT DOCUMENTS

| CN | 1815487 A | 8/2006 |
| CN | 108496094 A | 9/2018 |

(Continued)

OTHER PUBLICATIONS

Bryce Kellogg et al. "Passive Wi-Fi: Bringing Low Power to Wi-Fi Transmissions", NSDI, Mar. 16, 2016, p. 151-164.

(Continued)

*Primary Examiner* — Curtis B Odom
(74) *Attorney, Agent, or Firm* — Bayramoglu Law Offices LLC

(57) ABSTRACT

An orthogonal frequency-division multiple access (OFDMA)-based backscatter system is provided, including an analog portion and a digital logic portion. The analog portion includes an antenna, radio frequency switches, an envelope detection circuit, and a transmission line. The digital logic portion includes an inverse discrete Fourier transform (IDFT)-based digital frequency synthesis module. Two outputs of the digital logic portion control all of the radio frequency switches, and the envelope detection circuit provides an input of the digital logic portion. OFDMA backscatter tags designed can operate on any given subchannel without hardware being re-powered and modified, and can operate at a specified symbol rate. The system provides a networking physical layer foundation for a large amount of OFDMA backscatter tags, and satisfies the growing Internet of Things capacity requirements.

10 Claims, 2 Drawing Sheets

(56) References Cited

FOREIGN PATENT DOCUMENTS

| | | |
|---|---|---|
| CN | 111641577 A | 9/2020 |
| WO | 2015123306 A1 | 8/2015 |

OTHER PUBLICATIONS

Renjie Zhao et al."OFDMA-Enabled Wi-Fi Backscatter", MobiCom, Aug. 5, 2019, p. 1-15.

\* cited by examiner

ORTHOGONAL FREQUENCY-DIVISION MULTIPLE ACCESS-BASED BACKSCATTER SYSTEM

CROSS REFERENCE TO THE RELATED APPLICATIONS

This application is the national phase entry of International Application No. PCT/CN2021/101725, filed on Jun. 23, 2021, which is based upon and claims priority to Chinese Patent Application No. 202010383618.6, filed on May 8, 2020, the entire contents of which are incorporated herein by reference.

TECHNICAL FIELD

The present invention relates to the field of communication technology, specifically, to an orthogonal frequency-division multiple access (OFDMA)-based backscatter system. In particular, it relates to a design method of a backscattering tag based on inverse discrete Fourier transform (IDFT) digital frequency synthesis, which is applicable in OFDMA networks.

BACKGROUND

Backscatter communication has attracted a lot of attention in the field of internet of things (IoT) in recent years, and has the main feature as follows: the external electromagnetic waves are modulated to achieve backscatter communication. Since backscatter communication is not required for generating electromagnetic waves on its own, the power consumption is very low, only a few tens of microwatts, even when generated for Wi-Fi communication (see the 2016 paper by Bryce Kellogg et al. in NSDI). However, as the scale of IoT expands, multiple access technologies are gradually changing from time division multiplexing to frequency domain multiplexing. In 2019, Renjie Zhao et al. published "OFDMA-Enabled Wi-Fi Backscatter" in MobiCom, in which 48 data subcarriers in the 802.11g protocol assigned are allocated to 48 different backscatter tags to achieve parallel uplink, thereby solving the capacity problem of the network. However, with reference to these 48 tags, different frequency shifts are required for an analog frequency synthesizer. When the subchannel is changed, the frequency of the frequency shift must be changed and the hardware needs to be reconfigured, which poses a huge challenge to the design of the network protocol and a great engineering difficulty in building a large-scale OFDMA network. Since the biggest technical difficulty of OFDMA backscattering is the coupling between the frequency synthesis and the hardware, the present patent provides a software-level digital frequency synthesis algorithm to realize frequency synthesis so that the control of subchannels and the number of subchannels can be changed at the software level, which makes the practical application of the OFDMA backscattering network come true.

SUMMARY

In view of the shortcomings of the prior art, the purpose of the present invention is to provide an OFDMA-based backscatter system.

The OFDMA-based backscatter system provided by the present invention includes: an analog portion and a digital logic portion.

The analog portion includes an antenna, radio frequency (RF) switches, an envelope detection circuit, and a transmission line.

The digital logic portion includes an IDFT-based digital frequency synthesis module.

Two outputs of the digital logic portion control all the RF switches, and the envelope detection circuit provides an input of the digital logic portion.

Preferably, the antenna absorbs electromagnetic waves of a specific frequency band and provides a gain.

The RF switches switch impedance states.

The envelope detection circuit detects or demodulates external signals and gains energy from the external signals.

The transmission line achieves a phase shift and further achieves in-phase and quadrature (IQ) modulation.

The IDFT-based digital frequency synthesis module generates subcarriers of a specific frequency and provides an interface for modulation.

Preferably, the antenna is connected to a single-pole double-throw (SPDT) RF switch, and the SPDT RF switch is connected to the envelope detection circuit and a power divider, respectively.

Preferably, the power divider connects to two transmission lines, and each of the transmission lines is connected to an RF switch.

Each RF switch is connected to a VCC and a GND.

Preferably, the transmission line can be replaced by a phase shifter.

Preferably, the system further includes a synchronization algorithm for synchronizing the tag with an external excitation signal to avoid inter-symbol interference (ISI).

The synchronization algorithm is a digital-domain algorithm and is deployed on a logic unit. The logic unit includes a microcontroller unit (MCU) and a Field-Programmable Gate Array (FPGA).

Preferably, the synchronization algorithm refers to an IDFT-based low-power digital frequency synthesis algorithm applied to a backscatter communication.

Preferably, the synchronization algorithm calculates only phase changes based on output requirements of the backscatter tag baseband and determines an output as 0/1 for controlling the RF switches based on the phase.

The synchronization algorithm may also be applied to frequency shift keying (FSK) backscatter systems or other protocols or applications involving backscatter frequency changes in different application occasions.

Preferably, the synchronization algorithm provides two specific implementation methods corresponding to different ways of calculating the phase changes.

Multiplier-based phase calculation: Obtaining a current normalized phase directly by multiplying n obtained from a counter of a sampling clock, and after obtaining the normalized phase, determining an IQ path output logic value as 0/1 by evaluating a phase value after obtaining the normalized phase.

Register and adder-based phase calculation: Based on a characteristic that the sampling clock is configured to add 1 after every cycle, storing a previously accumulated normalized phase in a register, adding a corresponding phase increment every turn to avoid using a multiplier, and determining an IQ path output logic value as 0/1 by evaluating a phase value after obtaining the normalized phase.

Preferably, the normalized phase refers to a phase divided by $2\pi$.

Compared with the prior art, the present invention has the following advantages.

1. The present invention can realize an ultra-large scale OFDMA backscatter network at a low cost. By continuously dividing the spectrum in the digital domain, the OFDMA backscatter network can generate 1024 subcarriers, which is much more than 48 subcarriers generated in the existing OFDMA system using analog-digital frequency synthesis.

2. The present invention can realize hardware decoupling as well as physical layer modulation of the OFDMA backscatter network. Relevant physical layer parameters can be controlled at the software level, and the controllability of the physical layer directly affects the link layer design and the overall network functions.

3. Tags in the present invention can use downlink signaling to change the subchannel and the symbol rate without hardware modification or power-down reconfiguration, which provides a physical layer basis for the development of link layer protocols for the OFDMA backscatter networks.

BRIEF DESCRIPTION OF THE DRAWINGS

Other features, objects and advantages of the present invention will be more apparent upon reading a detailed description of the non-restrictive embodiments with reference to the following drawings.

DETAILED DESCRIPTION OF THE EMBODIMENTS

Figure 1:
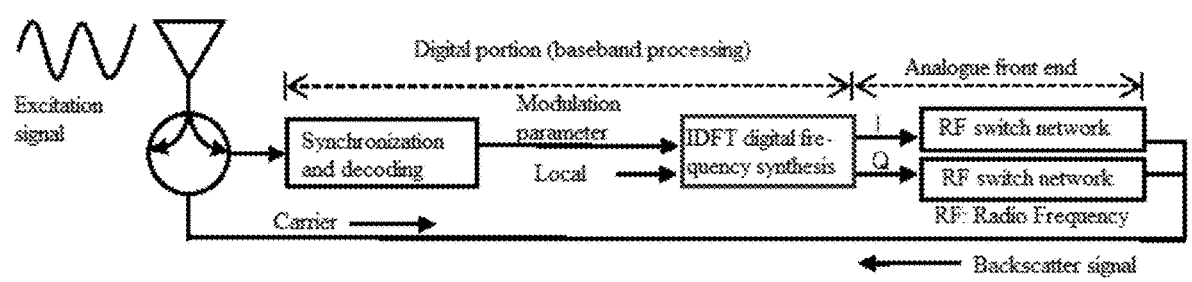
FIG. 1 shows a flow chart of the OFDMA backscatter tag workflow in the present invention using digital frequency synthesis.

The present invention is described in detail below in conjunction with specific embodiments. The following embodiments will assist those of skill in the art in further understanding the present invention, but do not limit it in any way. It should be noted that to a person of ordinary skill in the art, a plurality of variations and improvements can be made without departing from the concept of the present invention, and these variations and improvements fall within the scope of protection of the present invention.

The OFDMA-based backscatter system provided in the present invention includes:

an analog portion and a digital logic portion.

The analog portion includes an antenna, RF switches, an envelope detection circuit, and a transmission line.

The digital logic portion includes an Inverse Discrete Fourier Transform (IDFT)-based digital frequency synthesis module.

Two outputs of the digital logic portion control all the RF switches, and the envelope detection circuit provides an input of the digital logic portion.

Specifically, the antenna absorbs electromagnetic waves of a specific frequency band and provides a gain.

The RF switches switch impedance states.

The envelope detection circuit detects or demodulates external signals and gains energy from the external signals.

The transmission line achieves a phase shift and further achieves IQ modulation.

The IDFT-based digital frequency synthesis module generates subcarriers of a specific frequency and provides an interface for modulation.

Specifically, the antenna is connected to the SPDT RF switch, and the SPDT RF switch is connected to the envelope detection circuit and a power divider, respectively.

Specifically, the power divider connects to the two transmission lines, and each of the transmission lines is connected to the RF switch.

Each RF switch is connected to a VCC and a GND.

Specifically, the transmission line can be replaced by a phase shifter.

Specifically, the system further includes a synchronization algorithm for synchronizing the tag with an external excitation signal to avoid inter-symbol interference (ISI).

The synchronization algorithm is a digital domain algorithm and is deployed on a logic unit, and the logic unit includes a MCU and a FPGA.

Specifically, the synchronization algorithm refers to the IDFT-based low-power digital frequency synthesis algorithm applied to a backscatter communication.

Specifically, the synchronization algorithm calculates only phase changes based on the output requirements of the backscatter tag baseband and determines the output as 0/1 for controlling the RF switches based on the phase.

The synchronization algorithm may also be applied to FSK backscatter systems or other protocols or applications involving backscatter frequency changes in different application occasions.

Specifically, the synchronization algorithm provides two specific implementation methods corresponding to the different ways of calculating the phase changes.

Multiplier-based phase calculation: The current normalized phase is obtained directly by multiplying n obtained from a counter of a sampling clock. After obtaining the normalized phase, the phase value is evaluated to determine an IQ path output logic value as 0/1.

Register and adder-based phase calculation: Based on the characteristic that the sampling clock will add 1 after every cycle, the previously accumulated normalized phase is stored in the register, and the corresponding phase increment is added every turn to avoid using a multiplier. After obtaining the normalized phase, the phase value is evaluated to determine the IQ path output logic value as 0/1.

Specifically, the normalized phase refers to a phase divided by $2\pi$.

The present invention is described in detail by the following preferable embodiments.

Preferred Embodiment I

In response to the defects in prior OFDMA backscattering systems, an objective is to provide the backscattering system tag design with flexibility and practicability based on digital frequency synthesis.

The OFDMA-based backscatter system provided in the present invention includes the following parts.

Part 1: The Antenna

The antenna matches electromagnetic waves in specific frequency bands.

Part 2: The RF Switches

The RF switch selects the impedance state of the succeeding circuit.

Part 3: The Transmission Lines

Two different lengths of transmission lines with an electrical length difference of $1/8$, allow the tag to be I/Q modulated.

Part 4: The Envelope Detection Circuit

The diode-based envelope detection circuit outputs a 1-bit sequence by comparing a result of an integrator with a result of a comparator.

Part 5: The IDFT-Based Low-Power Digital Frequency Synthesis Algorithm

This algorithm, compared to a common IDFT algorithm, merely calculates the time domain signal of a single sub-carrier, that is, $x[n]=e^{j2\pi kn/N}$.

Since the output of the backscatter is the RF switch, which requires only the 1-bit quantization result, trigonometric calculation is not required but only phase information of the normalization is calculated, that is, p[n]=k·n/N. After obtaining the phase information, the simple logical judgment is sufficient to control the RF switch for modulation.

Preferably, the digital circuit design for phase calculation includes two design options.

Multiplier-based design: the product of k and n is first calculated and cyclically shifted right log(N) bits to obtain p[n].

Register and adder-based design: the calculation result of each clock cycle is stored in the register, and the result of k cyclically right shifting log(N) bits is added to the register every time n increases by 1, that is, $$\frac{k}{N}.$$

This algorithm can provide a PSK/FSK interface. Specifically, a new k parameter is loaded and the phase parameter is initialized at the beginning of each symbol. That is, the normalized phase calculation is written as p[n]=kn/N+ $p_0$, and the assignment interface for $p_0$ is provided, where n is the value of a counter of a sampling clock, p[n] is the value of a normalized phase, $p_0$ is the initial phase value, k is the index of an IDFT input, and N is the IDFT size.

Part 6: The Synchronization Algorithm

The synchronous digital circuit receives the 1-bit input from the envelope detection circuit and passes the 1-bit input into the shift register queue. The digital frequency synthesis algorithm is enabled by doing a correlation with the preset sequence to get a trigger signal indicating whether it is the matching signal.

Preferred Embodiment II

The OFDMA-based backscatter system adopts the OFDMA backscatter tags directly synthesized by the digital frequency. The backscatter system adopts digital algorithms for frequency synthesis, and achieves frequency shifting and subcarrier modulation. The system is described as follows.

The antenna is configured to absorb electromagnetic waves of the specific frequency band and provides the gain.

The RF switches are configured to switch impedance states.

The envelope detection circuit is configured to detect or demodulate external signals and gains energy from the external signals.

The transmission line (alternatively, a phase shifter) is configured to achieve a phase shift and further achieve IQ modulation.

The IDFT-based digital frequency synthesis module is configured to generate subcarriers of a specific frequency and provides the interface for modulation.

The synchronization algorithm is configured to synchronize with the external excitation signal to avoid ISI.

The synchronization algorithm is the IDFT-based low-power digital frequency synthesis algorithm applied to a backscatter communication.

Figure 2:
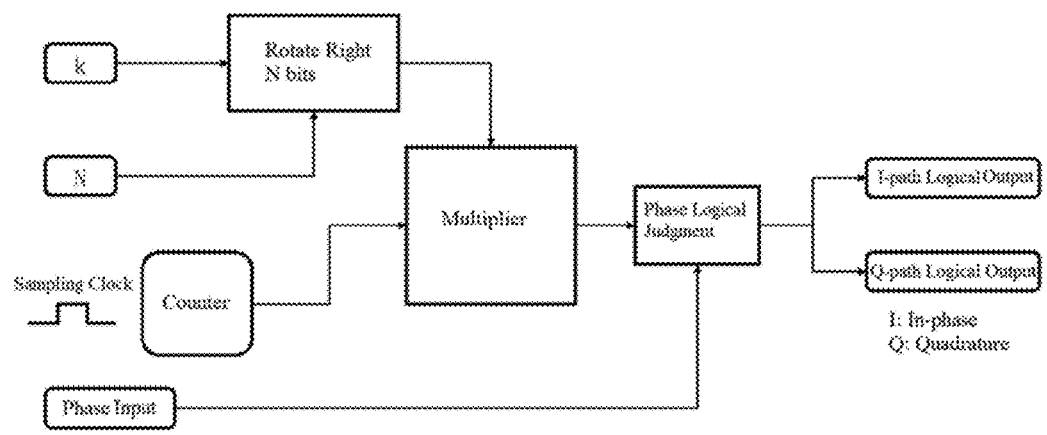
FIG. 2 shows a phase algorithm (A) in digital frequency synthesis in the present invention, that is, a multiplier-based algorithm model.
Figure 3:
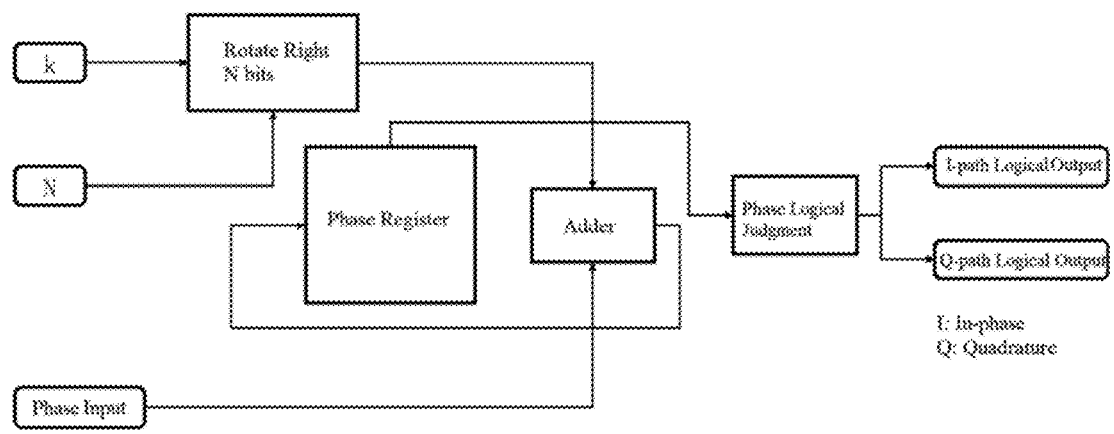
FIG. 3 shows a phase algorithm (B) in digital frequency synthesis in the present invention, that is, a register and adder-based algorithm model.

The synchronization algorithm is deployed on MCU/FPGA and exposes the interface to other chips. Optionally, users can use the algorithm as a sub-module on the FPGA/MCU to connect to other modules. The interfaces of the synchronization algorithm include the K/N interface and the phase interface shown in FIG. 2. The interfaces are either parallel or serial. The synchronization algorithm is characterized by calculating only phase changes based on the output requirements of the backscatter tag baseband and determines the output as 0/1 for controlling the RF switches based on the phase. The synchronization algorithm may also be applied to FSK backscatter systems or other protocols or applications involving backscatter frequency changes in different application occasions. The synchronization algorithm corresponds to two specific implementations according to the way the phase is calculated.

Multiplier-based phase calculation: The current normalized phase (that is, phase/2π) is obtained directly by multiplying n obtained from the counter of the sampling clock. After obtaining the normalized phase, the phase value is evaluated to determine an IQ path output logic value as 0/1.

Register and adder-based phase calculation: Based on the characteristic that the sampling clock will add 1 after every cycle, the previously accumulated normalized phase (that is, phase/2π) is stored in the register, and the corresponding phase increment is added every turn to avoid using a multiplier. After obtaining the normalized phase, the phase value is evaluated to determine the IQ path output logic value as 0/1.

Preferred Embodiment III

The backscatter system consisting of backscatter tags provided in the present invention includes the following parts.

Part 1: A Transmitter Generating a Specific Excitation Signal.

The transmitter can conduct IQ modulation, send On-Off Keys (OOK) signals, and purify carriers and orthogonal frequency-division multiplexing (OFDM) signals.

Part 2: The IDFT-Based Digital Frequency Synthesis Backscattering Tags According to the Description of the Present Invention.

The backscattering tags respond to the excitation signal sent by the transmitter and add the local data into the phase. Also, digital frequency synthesis is used to generate subcarriers. The output of the IDFT digital frequency synthesis is converted to an I/Q signal after passing a simple logical judgment and the I/Q signal is outputted to the RF switch on the I/Q path, achieving parallel OFDMA.

Part 3: A Receiver Configured to Receive and Demodulate the Backscattering Signals.

The receiver receives IQ data, conducts time-domain synchronization and frequency-domain synchronization, and performs digital signal processes such as Fast Fourier Transform (FFT) and so on.

Specifically, the technical solution is described by the following embodiments.

Embodiment I: Parallel test. 100 tags are randomly placed in an area with a diameter of 7 meters. Both the transmitter and the receiver are Mango Communications® WARP v3, operating in the 2.4 GHz band, and connected to a Lenovo®

ThinkPad P51 laptop via LAN. The transmitter transmits the excitation signal, and the synchronization modules of all tags start to execute their respective subcarrier modulations after them synchronizing with the excitation signal. The output subjected to phase modulation is converted into the switch-control logic signal of the I/Q path through the logic judgment, which controls the I path switch and Q path switch respectively to complete the I/Q modulation. In this process, the digital frequency synthesis modules of all tags follow the k-parameters and N-parameters specified by the transmitter (see Part 5 of the specification). Since the subchannels of all the tags do not conflict with each other, the OFDMA signals of the subchannels can be demodulated smoothly by the receiver.

Figure 4:
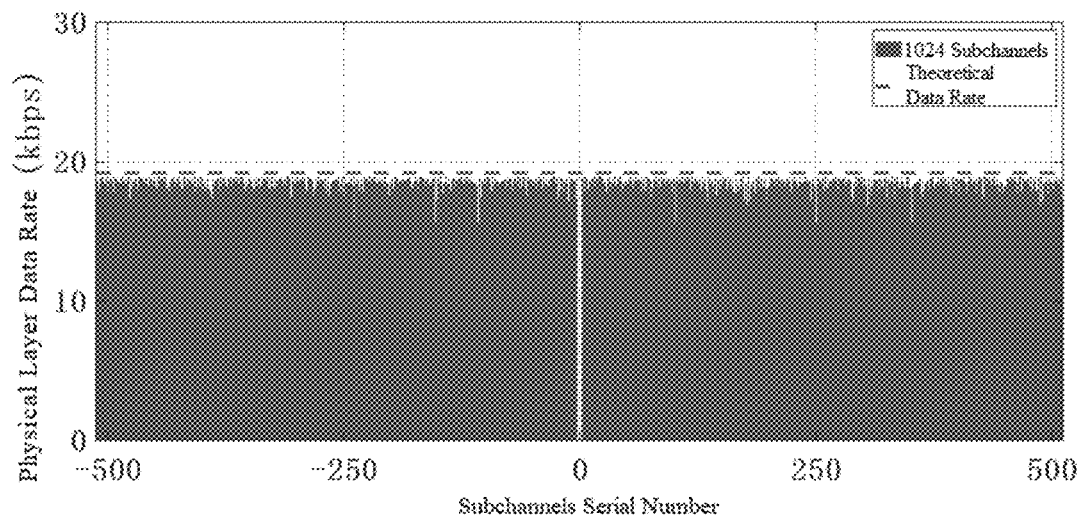
FIG. 4 shows the data rate of each subchannel measured by tag-traversing 1024 subchannels in Embodiment II.

Embodiment II: Subcarrier generation test. One tag is deployed 5 meters away from the transmitter. By modifying the control signaling of the transmitter, the digital frequency synthesis algorithm of this tag is required to traverse all k (k is an integer corresponding to the numbering of the subchannel) at N=1024. After demodulation at the receiver, the physical layer data rate on each subchannel is obtained. Both the transmitter and receiver are Mango Communications® WARP v3 with a frequency band of 2.4 GHz. The results are shown in FIG. 4.

In the description of the present invention, it must be understood that the orientation or positional relationship terms "upper", "lower", "front", "back", "left", "right", "vertical", "horizontal", "top", "bottom", "inside", "outside", and the other terms are based on the orientation or positional relationship shown in the drawings and are used only to facilitate and simplify the description of the present invention and not to indicate or imply that the device or element must have a particular orientation, be constructed or operate in a particular orientation, and therefore should not be construed as a limitation of the present invention.

It is known to those skilled in the art that, in addition to the system, the devices and the individual modules provided by the present invention and implemented by purely computer readable program codes, it is entirely possible to make the system, the devices and the individual modules provided by the present invention implement the same programs in the form of logic gates, switches, special integrated circuits, programmable logic controllers, and embedded microcontrollers, and other forms by logically programming the steps of the method. Therefore, the system, the devices and the individual modules provided by the present invention can be considered as a hardware component, and the modules for implementing various functions can be considered as both software programs for implementing the method and structures within the hardware components.

Specific embodiments of the present invention have been described above. It must be understood that the present invention is not limited to the specific embodiments described above, and a person skilled in the art may make various changes or modifications within the scope of the claims, which do not change the substantial content of the present invention. The embodiments and features in the embodiments of the present application may be combined with each other at will, provided that there is no conflict.

What is claimed is:

1. An orthogonal frequency-division multiple access (OFDMA)-based backscatter system, comprising:
    an analog portion and a digital logic portion; wherein,
    the analog portion comprises: an antenna, radio frequency (RF) switches, an envelope detection circuit, and a transmission line;
    the digital logic portion comprises: an inverse discrete Fourier Transform (IDFT)-based digital frequency synthesis module; and
    two outputs of the digital logic portion control all the RF switches, and the envelope detection circuit provides an input of the digital logic portion.

2. The OFDMA-based backscatter system according to claim 1, wherein
    the antenna absorbs electromagnetic waves of a specific frequency band and provides a gain;
    the RF switches switch impedance states;
    the envelope detection circuit detects or demodulates external signals and gains energy from the external signals;
    the transmission line achieves a phase shift and further achieves an in-phase and quadrature (IQ) modulation; and
    the IDFT-based digital frequency synthesis module generates subcarriers of a specific frequency and provides an interface for modulation.

3. The OFDMA-based backscatter system according to claim 1, wherein the antenna is connected to a single-pole double-throw (SPDT) RF switch, and the SPDT RF switch is connected to the envelope detection circuit and a power divider.

4. The OFDMA-based backscatter system according to claim 3, wherein the power divider connects to two transmission lines, and each of the transmission lines is connected to the SPDT RF switch; and
    the SPDT RF switch is connected to a VCC and a GND.

5. The OFDMA-based backscatter system according to claim 1, wherein the transmission line is allowed to be replaced by a phase shifter.

6. The OFDMA-based backscatter system according to claim 1, further comprising a synchronization algorithm for synchronizing a backscatter tag with an external excitation signal to avoid inter-symbol interference (ISI);
    the synchronization algorithm is a digital-domain algorithm and is deployed on a logic unit, and the logic unit comprises: at least one of a microcontroller unit (MCU) or a field-programmable gate array (FPGA).

7. The OFDMA-based backscatter system according to claim 6, wherein the synchronization algorithm refers to an IDFT-based low-power digital frequency synthesis algorithm applied to a backscatter communication.

8. The OFDMA-based backscatter system according to claim 7, wherein the synchronization algorithm calculates phase changes based on output requirements of a backscatter tag baseband and determines an output as 0/1 for controlling the RF switches based on a phase; and
    the synchronization algorithm is allowed to be applied to frequency shift keying (FSK) backscatter systems or other protocols or applications involving backscatter frequency changes in different application occasions.

9. The OFDMA-based backscatter system according to claim 8, wherein the synchronization algorithm provides two specific implementation methods corresponding to different ways of calculating the phase changes, and the two specific implementation methods are:
    multiplier-based phase calculation, comprising: obtaining a current normalized phase directly by multiplying n is a value of a counter of a sampling clock, and after obtaining the current normalized phase, evaluating a phase value to determine an IQ path output logic value as 0/1; and
    register and adder-based phase calculation, comprising: based on the characteristic that the sampling clock will add 1 after every cycle, storing a previously accumulated normalized phase in a register, and adding a corresponding phase increment every turn to avoid using a multiplier, and after obtaining the previously accumulated normalized phase, evaluating the phase value to determine the IQ path output logic value as 0/1.

10. The OFDMA-based backscatter system according to claim 9, wherein the normalization of a phase refers to a phase divided by $2\pi$.

* * * * *